US009225941B2

(12) United States Patent
Kennedy

(10) Patent No.: US 9,225,941 B2
(45) Date of Patent: Dec. 29, 2015

(54) SYSTEMS AND METHODS FOR HIGH-BANDWIDTH DELIVERY OF CUSTOMER-SPECIFIC INFORMATION

(75) Inventor: John T. Kennedy, Denver, CO (US)

(73) Assignee: Dish Network, L.L.C., Englewood, CO (US)

( * ) Notice: Subject to any disclaimer, the term of this patent is extended or adjusted under 35 U.S.C. 154(b) by 1613 days.

(21) Appl. No.: 12/197,100

(22) Filed: Aug. 22, 2008

(65) Prior Publication Data
US 2010/0050199 A1 Feb. 25, 2010

(51) Int. Cl.
*H04N 7/173* (2011.01)
*H04N 21/235* (2011.01)
*H04N 21/2543* (2011.01)
*H04N 21/258* (2011.01)
*H04N 21/434* (2011.01)
*H04N 21/435* (2011.01)
*H04N 21/84* (2011.01)

(52) U.S. Cl.
CPC ......... *H04N 7/17318* (2013.01); *H04N 21/235* (2013.01); *H04N 21/2543* (2013.01); *H04N 21/25866* (2013.01); *H04N 21/435* (2013.01); *H04N 21/4348* (2013.01); *H04N 21/84* (2013.01)

(58) Field of Classification Search
CPC ............. H04N 21/2543; H04N 21/84; H04N 21/47202; H04N 21/2385; H04N 21/458; H04N 21/2362; H04N 21/4532; H04N 7/162
USPC ....................... 725/37–61, 86–101
See application file for complete search history.

(56) References Cited

U.S. PATENT DOCUMENTS

| | | | | |
|---|---|---|---|---|
| 5,260,778 A * | 11/1993 | Kauffman et al. | | 725/33 |
| 5,432,542 A * | 7/1995 | Thibadeau et al. | | 725/35 |
| 5,565,909 A * | 10/1996 | Thibadeau et al. | | 725/35 |
| 5,931,905 A * | 8/1999 | Hashimoto et al. | | 709/217 |
| 6,183,366 B1 | 2/2001 | Goldberg et al. | | |
| 6,285,991 B1 * | 9/2001 | Powar | | 705/76 |
| 7,092,729 B1 * | 8/2006 | Fichet et al. | | 455/466 |
| 7,197,708 B1 | 3/2007 | Frendo et al. | | |

(Continued)

FOREIGN PATENT DOCUMENTS

WO  WO01/03341 A2 *  1/2001

OTHER PUBLICATIONS

European Patent Office, International Searching Authority, International Search Report mailed Nov. 9, 2009; International Application No. PCT/US2009/053755 filed Aug. 13, 2009.

(Continued)

*Primary Examiner* — Pankaj Kumar
*Assistant Examiner* — Alazar Tilahun
(74) *Attorney, Agent, or Firm* — Ingrassia Fisher & Lorenz, P.C.

(57) ABSTRACT

Customer-specific information such as billing information, a listing of available services or the like can be provided to multiple receivers via a satellite or other high-bandwidth connection. The customers to receive customer-specific information are selected, and a broadcast message is created that includes the customer-specific information, as well as an identifier for each receiver associated with the selected customers. The broadcast message is transmitted on the high-bandwidth connection to thereby allow each of the receivers associated with the selected customers to extract the customer-specific information based upon the identifier and to display the customer-specific information to the customer.

23 Claims, 3 Drawing Sheets

(56) References Cited

U.S. PATENT DOCUMENTS

Figure 1:
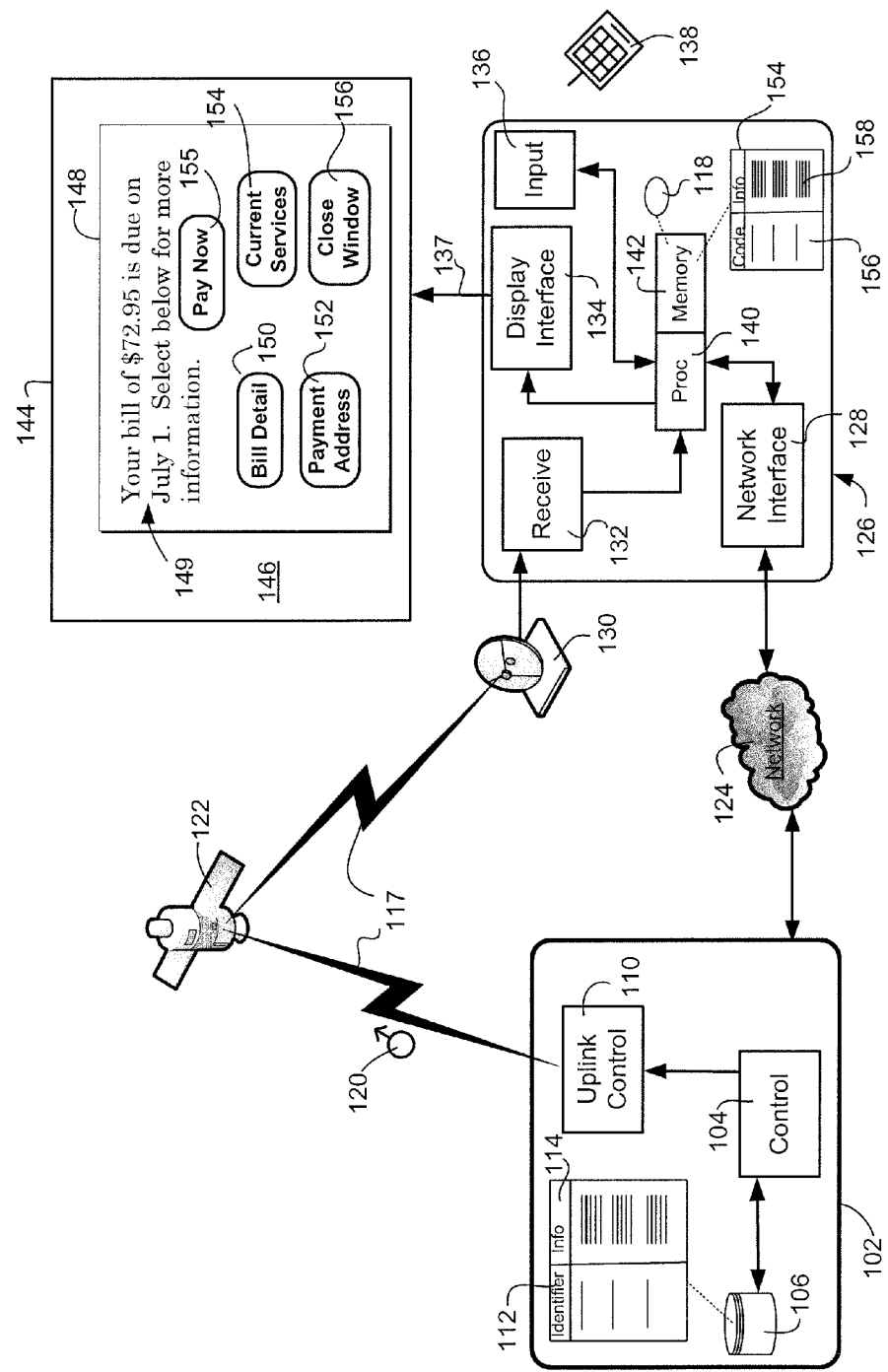

| | | | |
|---|---|---|---|
| 7,793,326 B2* | 9/2010 | McCoskey et al. | 725/91 |
| 2002/0124249 A1 | 9/2002 | Shintani et al. | |
| 2002/0142757 A1 | 10/2002 | Leung et al. | |
| 2002/0152117 A1 | 10/2002 | Cristofalo et al. | |
| 2003/0101451 A1 | 5/2003 | Bentolila et al. | |
| 2003/0208777 A1* | 11/2003 | Danker et al. | 725/135 |
| 2004/0117828 A1 | 6/2004 | Parker et al. | |
| 2004/0209649 A1* | 10/2004 | Lord | 455/558 |
| 2005/0108118 A1 | 5/2005 | Malackowski et al. | |
| 2006/0100948 A1 | 5/2006 | Millien et al. | |
| 2007/0088738 A1 | 4/2007 | Barney et al. | |
| 2007/0157225 A1 | 7/2007 | Harada et al. | |
| 2007/0294170 A1* | 12/2007 | Vantalon et al. | 705/50 |
| 2008/0005319 A1* | 1/2008 | Anderholm et al. | 709/224 |

OTHER PUBLICATIONS

TAEUS International Corporation, "TAEUS Review Reports," 2007, TAEUSworks Patent Analysis Reports; retrieved from the internet at http://www.taeus.com/content.php?page_id=32 on Jul. 27, 2007.

Fair Acounting Standards Board of the Financial Accounting Foundation, "Financial Accounting Series—Statement of Financial Accounting Standards No. 157," Sep. 2006.

TAEUS International Corporation: Semiconductor Reverse Entineering, "TAEUS Products and Services," 2007; retrieved from the internet at http://www.taeus.com/ on Jul. 27, 2007.

Ocean Tomo, "Valuation/Analytics IP Acquisition," 2007; retrieved from the internet at http://www.oceantomo.com/valuationservices.html on Jul. 27, 2007.

Ocean Tomo, "Patent Due Diligence Report," Jun. 30, 2006.

Dish Network, "iTV Overview"; retrieved from the internet at http://www.dishnetwork.com/content/our_products/interactive_tv/general_info/index.shtml on Aug. 22, 2008.

Kennedy, John T., U.S. Appl. No. 11/831,095, filed Jul. 31, 2007.

Kennedy, John T., U.S. Appl. No. 12/023,559, filed Jan. 31, 2008.

Intellectual Property Office "Office Action" issued Oct. 23, 2012 for Taiwan Patent Appln. No. 098125561.

Intellectual Property Office, Office Action for ROC (Taiwan) Patent Application No. 098125561 mailed Jan. 6, 2015.

Intellectual Property Office "Decision of the Intellectual Property Office" dated May 20, 2013 for Taiwan Patent Appln. No. 098125561.

* cited by examiner

SYSTEMS AND METHODS FOR HIGH-BANDWIDTH DELIVERY OF CUSTOMER-SPECIFIC INFORMATION

TECHNICAL FIELD

The present invention generally relates to distribution of customer-specific information, such as billing and/or service information, to customers via a satellite or other high-bandwidth connection.

BACKGROUND

Most television viewers now receive their television signals through a content aggregator such as a cable or satellite television provider. In the typical instance, encoded television signals are sent via a cable or wireless data link to the viewer's home, where the signals are ultimately decoded in a set-top box or other consumer device. The decoded signals can then be viewed on a television or other appropriate display as desired by the viewer.

Often, the content aggregator offers various programming options and/or other services that allow different customers to select desired services at a price point that is appropriate for the particular customer. Aggregators typically offer various subscription packages that include different channel selections or other options, and customers are frequently able to supplement their basic subscriptions with add-on services such as pay-per-view programs, premium channels and/or the like. Consumers then pay the content aggregator for received services on a monthly or other basis.

Often, customers have questions regarding the particular programming features available to the consumer, and/or regarding the particular billing associated with such features. To respond to such questions, content aggregators typically provide access to any human operators in a customer service center that are able to respond to questions via telephone, email or other media. While such service centers can be very effective in responding to a variety of customer inquiries for specific information, customer service facilities can be relatively expensive to the aggregator in terms of labor and capital. Moreover, many consumers would prefer an immediate response to simple inquiries that does not involve a call to a service center. That is, some consumers may prefer to quickly identify an answer to a question themselves rather than contacting another person for the answer. Further, the service center model typically waits for the customer to make contact with the service agent; there is no convenient mechanism for automatically and inobtrusively "pushing" information to the customer.

It is therefore desirable to create systems and methods for reducing the number of calls placed to a customer service center. Moreover, it is desirable to create convenient information-providing systems and methods that allow customers to conveniently obtain information about their purchased services, billing and/or the like. These and other desirable features and characteristics will become apparent from the subsequent detailed description and the appended claims, taken in conjunction with the accompanying drawings and this background section.

BRIEF SUMMARY

In various embodiments, customer-specific information such as billing information, a listing of available services and/or the like can be provided to multiple receivers via a satellite or other high-bandwidth connection. The particular customers to receive customer-specific information are selected, and a broadcast message is created that includes the customer-specific information, as well as an identifier for each receiver associated with the selected customers. The broadcast message is transmitted on the high-bandwidth connection to thereby allow each of the receivers associated with the selected customers to extract the customer-specific information based upon the identifier and to display the customer-specific information to the customer.

In other embodiments, a method of providing customer-specific information to a customer associated with a television receiver is provided. The television receiver is configured to receive television content over a high bandwidth connection and to provide the television content to the customer on a display. A message comprising the customer-specific information via the high bandwidth connection is received at the television receiver, and an identifier associated with the television receiver in the message is recognized. If the identifier associated with the television receiver is recognized, the customer-specific information is extracted from the message and presented to the customer via the display.

In still other embodiments, a television receiver system for providing television content received via a high-bandwidth connection to a display for viewing by a customer is provided. The receiver system comprises a receiver interface configured to receive data via the high-bandwidth connection, a display interface, a memory configured to store an identifier that uniquely identifies the television receiver system, and a processor coupled to the receiver interface, the display interface and the memory. The processor is configured to receive the data from the receiver interface, to recognize the identifier in a broadcast message contained in the data, and, in response to recognizing the identifier in the broadcast message, to extract customer-specific information from the broadcast message and to present the customer-specific information to the customer via the display.

Various other embodiments, aspects and other features are described in more detail below.

BRIEF DESCRIPTION OF THE DRAWING FIGURES

Figure 2:
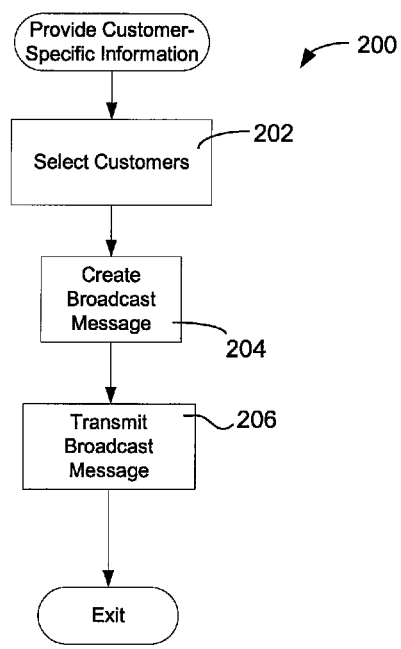
Figure 3:
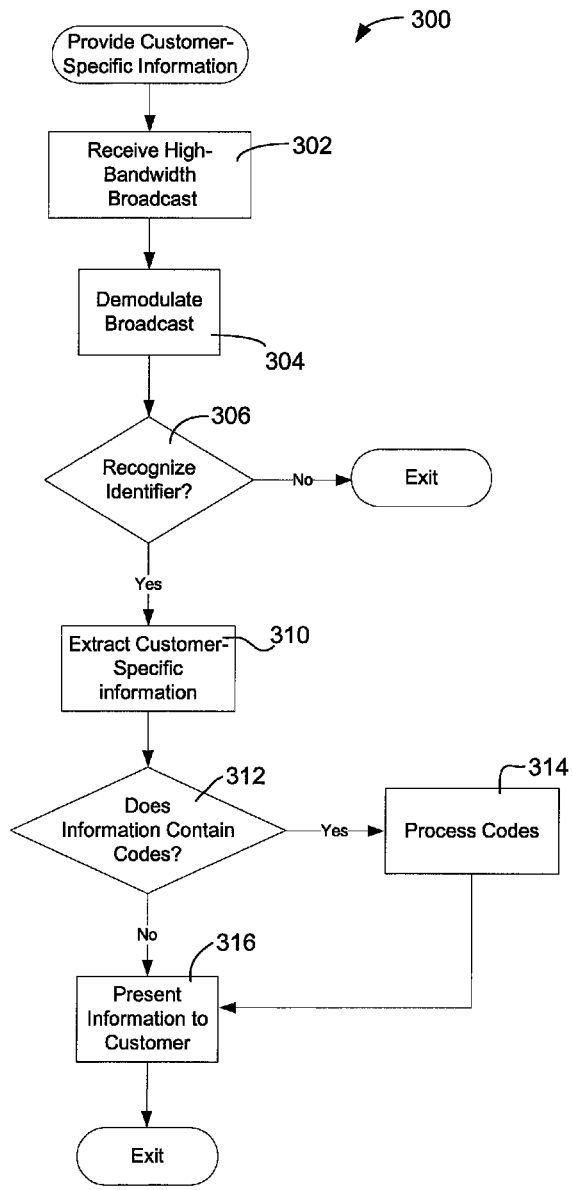

Exemplary embodiments will hereinafter be described in conjunction with the following drawing figures, wherein like numerals denote like elements, and FIG. 1 is a diagram of an exemplary system for distributing customer-specific information content to customers;

FIG. 2 is a flowchart of an exemplary process for providing customer-specific information to a number of customers via a high-bandwidth connection; and FIG. 3 is a flowchart of an exemplary process for providing customer-specific information to a customer using a high-bandwidth receiver.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

It has been recognized that a significant number of calls to a typical customer service center for a television content aggregator relate to relatively simple requests for billing information, service information and/or the like. For example, many customer calls are simple inquiries for billing information such as amounts due, due dates, mailing addresses for sending bills and/or the like. Many other calls are simple inquiries as to what services are available to the customer (e.g., whether a customer's service plan includes a particular channel or service). These calls, while relatively simple to process, can consume significant amounts of service center labor and capital that could otherwise be applied for more demanding tasks.

The number of calls to a customer service center can be reduced, however, by conveniently providing customer-specific information such as billing information and/or the like to the customer using the same set-top box or other receiver that provides television programming. Customer-specific information may be provided to the receiver via a broadcast message on a satellite or other high-bandwidth connection, for example. By providing customer-specific information directly to the receiver, many simple customer inquiries can be eliminated, thereby reducing demands on service center capacity.

Further, by "pushing" customer-specific information directly to the receiver, added convenience for both the customer and the content aggregator can be provided. That is, the customer's attention can be affirmatively directed toward the pushed information, if desired, thereby reducing the need for the customer to seek out the information on his or her own. This can be particularly useful as a billing due date approaches, for example, or as a customer's account becomes past due. The broad concept of delivering billing and/or other customer-specific information over the content-delivery channel can be implemented and modified in many ways, many of which are described below.

Turning now to the drawing figures and with initial reference to FIG. 1, an exemplary system 100 for delivering customer-specific content suitably includes a data center 102 that controls content and data sent over a high-bandwidth connection 117 to any number of receivers 126. In the embodiment shown in FIG. 1, high-bandwidth connection is shown as a direct broadcast satellite (DBS) link transmitted via a satellite 122, although equivalent embodiments could implement connection 117 as any sort of cable, terrestrial wireless and/or other connection as desired. In satellite implementations, a challenge often arises due to the limitations and/or then unavailability of a back-channel connection 124. That is, although very high communications bandwidth exists on channel 117 in a forward direction from center 102 to receiver 126, relatively little (if any) bandwidth is available for communications from receiver 126 back to center 102 over a back channel connection 124. As a result, conventional efforts to obtain customer-specific information on receiver 126 in response to a request sent from receiver 126 over a back channel 124 have met with limited success, at best.

Backchannel limitations can be overcome, however, by providing customer-specific information such as billing information, lists of available services and/or the like over the high-bandwidth connection 117. Customer-specific information for one or more particular receivers 102, for example, can be marked with an identifier 118 associated with a particular receiver 102, and the marked information can be transmitted within a message 120 that is broadcast across connection 117. Each receiver 102 is then able to receive the broadcast message 120, to recognize its unique identifier 118 in the broadcast, and to process any information associated with the identifier 118 as appropriate. In some further embodiments, the customer-specific information can be partially or entirely specified by shorthand codes contained in the broadcast message 120. The receiver 126 can then process the codes using additional information 112 previously stored within the receiver 126, as described more fully below.

Data center 102 includes one or more conventional data processing systems that are capable of producing signals that are transmitted on high-bandwidth connection 117. In various embodiments, data center 102 represents a satellite or other content distribution center with a data control system 104 for controlling content and an uplink control system 110 for transmitting content on the high-bandwidth connection 114. These systems may be geographically, physically and/or logically arranged in any manner, with content control and uplink control being combined or separated as desired.

For transmitting customer-specific information, control system 104 generally interacts with a database 106 that includes the relevant information 114 indexed by any appropriate key field 112 that can be associated with a particular customer, receiver 126 and/or the like. In various embodiments, key field 112 corresponds to the identifier 118 stored in each receiver 126; that is, information 114 is able to be associated with a particular receiver 126 and/or a particular customer in any manner. Database 106 may be implemented as a part of a billing or customer management subsystem that may or may not be geographically or physically located in the same place as control system 104.

Information 114 may include any sort of information about or relating to any particular customer, receiver 126 and/or the like. In various embodiments, information 114 includes billing information such as amounts due, itemized charge items, payment due dates, addresses (e.g., mailing addresses and/or electronic addresses) used for receiving payment, and/or the like. Customer-specific information 114 may alternately or additionally include a listing of available channels or other services, or any other information about services subscribed or purchased by one or more customers.

In various embodiments, the actual information 114 contained within database 106 and/or transmitted in message 120 may be represented by any sort of shorthand code. Such codes may represent common services available from a content aggregator, for example, such as a particular subscription plan or the like, these codes may be shared with any number or receivers 126 on any basis to allow for compressed data transmission over connection 117. That is, if receiver 126 has a listing of codes and associated information, the entire information can be represented by the shorthand code in message 120. This is described more fully in the discussion of table 158 below.

Broadcasts 120 can be scheduled in any temporal manner, including any sort of regular, irregular, batch, and/or as-needed basis as desired. Various broadcasts may provide billing information in advance of a due date, for example, to serve as a reminder of an upcoming bill payment. Similarly, broadcasts may be sent to particular customers whose accounts are past-due, or nearly past-due. Other broadcasts 120 may be scheduled on any regular or irregular bases, as desired. Billing information may be updated regularly (e.g., daily, weekly, monthly), for example, or in response to particular services (e.g., pay-per-view, content-on-demand, games, etc.) being ordered. Broadcast messages 120 may be scheduled during periods in which excess bandwidth is available on connection 117, in which receiver 126 is expected to be relatively inactive, or at any other suitable time. Scheduling may be coordinated and implemented using control system 104 and/or database 106 as desired. Information in messages 120 may be further encrypted, compressed or otherwise processed as desired.

Uplink control system 110 is any sort of data processing and/or control system that is able to receive the customer-specific information and to direct the transmission of broadcast message 120 on high-bandwidth connection 117 in any manner. In the exemplary embodiment illustrated in FIG. 1, uplink control system 110 is able to transmit the broadcast message to satellite 122 for repeated transmission to receivers 126 on any suitable transponder or other channel. The particular channel selected may be a uniquely-identified control channel on a frequency that can be received by receivers 126 tune to at a particular time, for example. Such a control channel may be used to transmit other information such as conventional conditional access system (CAS) messages and/or the like. In other embodiments, however, any available bandwidth within connection 117 can be used to transmit broadcast message 120 as desired. In still other embodiments, uplink control system 110 transmits message 120 over a cable, terrestrial wireless, telephone and/or other data connection 117 as desired.

Receiver 126 is any device, system or logic capable or receiving signals via high-bandwidth connection 117 and providing demodulated content to a customer via a television or other display 144. In various embodiments, receiver 126 is a conventional set-top box receiver commonly used with DBS or cable television distribution systems. In other embodiments, however, receiver 126 may be commonly housed within a television or other display 144. In still other embodiments, receiver 126 is a portable device that may be transportable with or without any sort of display 144. Receiver 126 may also provide broadcast television reception, video game playing, personal video recorder and/or other features as desired.

Receiver 126 typically includes a conventional interface 132 to the high-bandwidth communications link 117 and an interface 134 to display 144, as well as a processor 140 and associated memory or other storage 142 as desired. In various embodiments, processor 140 is a conventional microprocessor, microcontroller, digital signal processor and/or the like with associated memory, input/output and other features as appropriate. The Broadcom Corporation of Irvine, Calif., for example, produces several models of processors (e.g., the Broadcom Model BCM 7400 family of processors) that are capable of supporting "system on a chip (SoC)" implementations of satellite and/or cable receivers 126, although similar products from any number of other suppliers could be equivalently used. Receiver 126 may also include any sort of input interface 136, such as any sort interface to a keypad, touchpad or other physical feature provided with receiver 126, or any sort of infrared, radio frequency (RF) and/or other interface to a remote control 138 or similar input device, as appropriate. In embodiments that include back channel functionality, an interface 128 to any sort of back channel network 124 may also be provided. Examples of interface 128 may include any sort of network interface adapter to any sort of wireless or wired local area or wide area network, or any sort of wireless or wired telephone interface and/or the like.

During typical operation, receiver 126 receives television programming and/or other services via high-bandwidth connection 117. In the DBS implementation illustrated in FIG. 1, for example, programming and other content is received from satellite 122 at an antenna 130, which provides the received content to receiver interface 132. Processor 140 (or another processor within receiver 126) demodulates, decompresses and/or otherwise processes the received digital data, and then converts the received data to a signal 137 that can be viewed by the customer on display 144.

Customer-specific information may be processed at receiver 126 in any manner. In various embodiments, receiver 126 stores an identifier 118 in memory 142 (or other appropriate storage, such as a hard disk drive) that uniquely identifies receiver 126 within system 100. Identifier 118 may be any sort of cryptographic key, for example, such as a key used in a conventional CAS system, although any other unique identifier 118 could be equivalently used.

In various embodiments, broadcast messages 120 received via interface 132 are parsed or otherwise processed (e.g., by processor 140) to recognize identifier 118 in the message 120. If identifier 118 is present within the message 120, then customer-specific information (e.g., information 114) can be extracted and presented to the customer on display 144 in any manner. As noted above, the customer-specific information contained within message 120 may be represented in an shorthand manner using any sort of codes 114 as appropriate. In such embodiments, receiver 126 typically maintains a table 154 (e.g., a look-up table stored in memory 142, mass storage, or elsewhere) that allows for ready conversion from shorthand codes 156 to more detailed information 158. This allows relatively long text strings (e.g., "Complete movie package") and the like that are commonly sent across link 117 to be represented in a much more bandwidth efficient manner (e.g., "A1"). Table 154 may be updated from data center 102 via connection 117 on any regular or irregular basis, as desired. Additional information about various techniques for processing customer-specific information is provided below.

Display 144 is any television, monitor and/or the like capable of displaying imagery 146 for viewing by one or more customers. In many embodiments, processor 140 is also able to generate on-screen displays such as windows, menus, graphical user interface (GUI) features, and/or the like on display 144 as desired. The exemplary imagery 146 shown in FIG. 1, for example, shows a "pop-up" or other window 148 for presenting customer-specific information to the customer. In this particular embodiment, textual data 149 indicates that a bill of "$72.95" is due on "July 1", and prompts the customer to select a button or other feature for additional information. Button 150, for example, could lead to another window that provides an itemized billing statement (e.g., listing standard subscription charges and/or additionally requested features such as pay-per-view content, content on demand, video games, and/or the like). The additional information may be provided over connection 117, or may be partially or entirely collected at receiver 126 as services are requested. Button 152 could lead to another window that provides a mailing address for bill payment, whereas button 154 could lead to a listing of currently-subscribed services (e.g. a listing of available channels, or other features). Some or all of the information contained in these windows may be transmitted from database 106 to receiver 126 via connection 177, in accordance with various embodiments.

In various further embodiments, an option to "pay now" 155 could be additionally provided. Such embodiments could allow a customer to enter bill payment information (e.g., a credit card number) via a remote control 138 or other input device that could be provided to service center 102 via backchannel 124. In embodiments where backchannel 124 is not available or convenient, however, "pay now" functionality could be omitted without affecting the other features provided.

Customer-specific information such as that shown in window 148 may be provided on display 144 in any manner. In various embodiments, information is displayed instantly upon receipt, at a particular time (which may be indicated in message 120), at any time that receiver 126 identifies that the customer is actively watching display 144, at a time in which display 144 is relatively idle (e.g., during viewing of an electronic program guide), or the like. In such embodiments, information 114 may be "pushed" to the customer without requiring an express request or other affirmative act on the part of the customer. This can be particularly helpful if the customer's bill is past due, for example, or in providing a reminder that a payment due date is approaching, or for providing an indication that a payment method (e.g., credit card number) is expired/expiring, or the like. In other embodiments, customer specific information is automatically delivered to receiver 126, but the received information is simply stored (e.g., in memory 142, mass storage, and/or the like) until the information is expressly requested by the customer. The request may be in the form of a request made through a menu system, for example, or any other interface feature supported by receiver 126. In still other embodiments, the customer receives a "message" in an inbox or the like indicating that billing information is available. In such embodiments, the customer receives a pushed indication that customer-specific information has been received, but the customer is still able to retrieve the information at a time selected by the customer, if at all.

In practice, then, system 100 allows customer-specific information to be provided from a data center 102 to a particular customer using that customer's receiver 126. Customer-specific information 114 is provided in a message 120 that is broadcast on connection 117, with unique identifiers 118 contained in the message 120 indicating those receivers 126 that are to extract and display the received information. Because customers are able to conveniently view their customer-specific billing, service and/or other information directly on their own display 144, many simple inquiries can be quickly and readily resolved without the need to contact the aggregator's customer service center. Various data processing techniques are described in additional detail below.

Turning now to FIG. 2, an exemplary method 200 for providing multiple customers with customer-specific information 114 suitably includes the broad steps of selecting customers to receive customer-specific information 114 (step 202), creating a broadcast message 120 (step 204) containing indicators 118 associated with each of the selected customers, and transmitting the broadcast message (step 208) to the receivers 126 associated with the selected customers via the high-bandwidth connection 117. In various embodiments, the elements of method 200 are carried out under the direction of data processing and/or control systems such as control system 104, database 106 and/or uplink control system 110 at data center 102 (FIG. 1). Hence, the various steps to method 200 may be executed with computer-executable software or firmware in any source code, object code or other format that can be stored in any location (e.g., any digital memory, mass storage and/or the like) and/or executed on any processing circuitry.

Customers receiving customer-specific information in broadcast messages 120 may be selected in any manner (step 202). Customers may be selected using conventional database query and processing techniques using control system 104 and/or database 106, as appropriate. In various embodiments, it may be desirable to select some or all of the customers located within a common geographical area (e.g., a common state, city, ZIP code and/or the like), for example, or to select some or all of the customers having common attributes of any sort (e.g., common subscription plans, common demographic attributes, common billing cycles and/or the like). Further, multiple messages 120 may be coordinated based upon various factors. Different customers (e.g., customers in the same or different geographic regions) could be targeted with billing reminders at different times of the billing cycle to spread the workload of a bill processing center, for example.

Broadcast message 120 may be created in any manner (step 204). In various embodiments, message 120 may be formulated at control system 104 in response to queries posited to database 106, as appropriate. Message 120 may therefore include any number of identifiers 118 associated with one or more receivers 126, along with the customer-specific information 114 that is desired to be transmitted. As noted above, some or all of information 114 may be abbreviated or compressed through the use of codes 156 that have been shared with receivers 126 to reduce bandwidth demands on link 117. Messages 120 may be further encrypted, compressed and/or otherwise processed as desired for the particular embodiment. Such processing may take place at control system 104, uplink control system 110 and/or any other processing system as desired.

Message 120 is then transmitted on high-bandwidth connection 117 as appropriate (step 206). In various embodiments, the transmission is a broadcast on a satellite, cable, wireless or other medium that allows the various receivers 126 associated with the selected customers to receive the customer-specific information. As noted above, messages 120 on connection 117 may be schedule in any temporal manner, and may be sequenced in any manner to reduce bandwidth demands on connection 117, or for any other purpose.

Messages 120 transmitted across high-bandwidth connection 117 may be processed at the various receivers 126 in any manner. Referring now to FIG. 3, an exemplary process 300 for providing customer-specific information to a customer with a television receiver 126 suitably includes the broad steps of receiving a message 120 on the high-bandwidth network 117 (step 302), recognizing the identifier 118 associated with the particular receiver 126 in the received message (step 304), and, if the message 120 contains the identifier 118, extracting the customer-specific information (step 310) and presenting the information to the customer (step 316). These basic steps may be augmented and/or modified in any manner, as described more fully below.

Generally speaking, method 300 may be carried out with any sort of hardware, software and/or firmware logic within receiver 126. In various embodiments, the various steps of method 300 are carried out in response to software or firmware instructions stored in memory 142, or on a disk drive and/or other storage associated with receiver 126. Such instructions may be executed by processor 140 and/or by any other processing features within receiver 126.

Customer-specific information 114 may be received from the high bandwidth connection 117 in any manner (step 302). In various embodiments, content is contained within a broadcast or other message 120 that is formulated, for example, as described above and transmitted over high-bandwidth connection 117 on any available transponder, channel, frequency and/or the like. Message 120 may be sent along with television content (e.g., DBS or cable television signals). The message is then received at an antenna (e.g., antenna 130) or the like and passed to processor 140 via any suitable receiver interface 132. Signals received via high-bandwidth connection may be demodulated (step 304) and/or otherwise processed at receiver interface 132, processor 140 and/or elsewhere as appropriate to obtain digital data that can be processed within processor 140. As noted above, the received data may include television content as well as any control data, including CAS data and/or the like.

Receiver 126 recognizes customer-specific content 114 in the received signals in any manner (step 306). In various embodiments, receiver 126 has a digital identifier 118 stored in memory (e.g., memory 142), mass storage and/or any register in processor 140 that can be compared to identifiers 112 contained within the received message 120. Processor 140 is able to recognize its intended customer-specific content, then, when the identifier 120 associated with receiver 126 is found within message 120. This recognition may be executed at processor 140 or elsewhere using conventional comparator logic or the like. If the receiver's identifier 120 is not recognized within the received message 120, then that particular message 120 may be discarded, or otherwise omitted or excluded from further processing. In various embodiments, customer-specific content may be contained within the same message 120 as any sort of global information or content; in such embodiments, message 120 may some contain instructions or data that are further processed by receiver 126 even though the message 120 does not contain customer-specific information 114 intended for that particular receiver.

If the identifier 120 associated with the particular receiver is recognized in step 306, however, the customer-specific information 114 intended for that receiver 126 is extracted as appropriate (step 310). In various embodiments, some or all of message 120 is parsed, decompressed, decrypted and/or otherwise processed as appropriate to obtain the particular customer specific information 114 intended for that particular receiver 126. This processing may be performed by processor 140, for example, or any other processing circuitry within receiver 126.

As noted above, various embodiments may implement shorthand codes 156 in message 120 to reduce bandwidth consumption on connection 117. In such embodiments (step 312), receiver 126 suitably process the codes 156 (step 314) as appropriate. Codes contained in the extracted information 114, for example, may be cross-referenced to codes 156 stored in table 154 as appropriate to obtain text strings, descriptors and/or other information to be presented to the user but that may not be contained directly within message 120. As noted above, codes are not necessary to all embodiments, so steps 312 and 314 may be readily omitted in various equivalent implementations.

Customer-specific information 114 may be presented to the customer in any manner (step 316). In various embodiments, information 114 is presented in a window (e.g., window 148 in FIG. 1) or other interface feature on display 144 at an appropriate time. Alternatively, information 114 may be provided in an inbox or similar messaging feature provided by receiver 126. In still other embodiments, information 114 may be provided as part of an information scroll bar or other feature that provides news bulletins or the like. The particular interface features used to present the information 114 may vary widely from embodiment to embodiment.

The time for presentation may be similarly determined in any manner. The information may be automatically provided or made available immediately upon receipt, for example, or when the customer next uses the receiver 126, or the like. Alternatively, the time for presenting the information may be expressly determined by information provided in message 120 (e.g., "when the receiver 126 is activated on or after June 15", or "15 days before a billing due date"). Information 114 may therefore be presented to the customer on any temporal basis, as appropriate for the particular information 114 provided.

Although customer-specific information 114 is "pushed" to receiver 126 via connection 117, the presentation to the customer may be "pushed" (e.g., by affirmatively displaying a pop-up or other window to the customer without receiving an express request for the information) and/or "pulled" in response to an express request as desired. In various embodiments, "pushed" and "pulled" messages can be combined, with some information (e.g., a reminder of an upcoming or past billing due date) being pushed, and other information (e.g., billing address, service lists, etc.) being pulled. The exemplary display window 148 shown in FIG. 1, for example, allows the customer to conveniently request additional customer-specific information 114, as desired; many other interface designs and techniques could be readily adapted to provide information 114 in a manner that is both informative and convenient to the customer. The particular presentation techniques or parameters may be directed by software or firmware within receiver 126, by instructions contained within message 120, and/or the like.

Methods 200 and 300 may be repeated on any frequency or temporal basis. Customer specific information 114 may be transmitted on connection 117 on an hourly, daily, weekly and/or monthly basis, for example, or on an aperiodic basis as bandwidth on connection 117 becomes available, and/or on any other basis desired.

The general techniques outlined above may be supplemented or modified in many different ways. For example, customer-specific information may be implemented in the context of any sort of information distribution scheme or program. In the course of a billing program, for example, customers across various geographic areas or other demographics could be targeted with customer-specific information an a staggered basis to reduce peak demands on bill processing resources, to equalize cash flow over a period of time, and or the like.

Further, information provided via messages 120 may be supplemented or enhanced with information stored in receiver 126. In addition to the codes 156 stored in table 154, receiver 126 may be capable of storing information about pay-per-view, content-on-demand, video games, and/or other special services ordered by the customer. This information (e.g., program titles, times ordered, prices, etc.) may be provided with the requested content, or receiver 126 could obtain the information from an electronic program guide or any other feature accessible to receiver 126. Such information may be retained within receiver 126 and combined with subsequently-received information in any manner. Detailed billing statements, for example, can be generated from such information and presented to the customer as appropriate. A billing statement that indicates a pay-per-view purchase on a particular date, for example, can be cross-referenced to information about the particular purchase that is retained in receiver 126 from the time of purchase.

Further, embodiments that include a backchannel connection (e.g., network 124 in FIG. 1) could use the delivery techniques and systems described above to notify the customer that a bill is coming due, and also provide a uniform resource locator (URL) or other link over the back channel to allow for convenient payment. Such a link could be made over a phone connection (using modulated signals, simple message service (SMS) or any other communication scheme), or over the Internet or other network connection as appropriate. Message targeting, interactivity and/or other features may be further exploited to increase the usefulness of the various systems and techniques described above.

Further, the various systems and techniques described herein could be coordinated with customer-service features in any manner. Customer-specific information could be transmitted to customers at times that reduce peak demands on customer service centers, for example, or links to customer service features (e.g., features available over a back channel connection) could be presented to the customer along with the customer-specific information. For example, a customer viewing an on-screen bill could be presented with a text messaging option to text message a call agent for additional information. Text messaging charges could be processed in any manner; in various embodiments, the customer's telecommunications company invoices the customer directly for the connection and/or indirectly for any service provided. Text messages sent from the customer service agent could be received over backchannel 124 and displayed by receiver 126 as desired. In this manner, the costs of the customer service center can be offset, with billing provided by the customer's telecommunications provider and convenient integration with the customer's receiver 126.

By simply providing customer-specific information 114 to the customer's receiver 126, however, the demands upon the content aggregator's customer service center can be significantly reduced. Customers are able to view their particular billing, service, and/or other information in a manner that is convenient, and that is appropriately unobtrusive. Moreover, customer responsiveness can be further enhanced by "pushing" information to the receiver 126 in various embodiments, thereby improving the customer service experience for both the customer and the content provider.

While at least one exemplary embodiment has been presented in the foregoing detailed description, it should be appreciated that a vast number of alternate but equivalent variations exist. Although the systems and techniques described herein are frequently described with respect to satellite-based implementations, for example, similar concepts could be readily applied with cable, telephone, wireless and/or any other methods of television and other media content delivery.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method of providing customer-specific information to each of a plurality of customers via a high-bandwidth connection, wherein each of the plurality of customers is associated with one of a plurality of receivers each having an identifier, the method comprising:
    automatically selecting a subset of the plurality of customers based upon the customer-specific information associated with each of the plurality of customers in the subset of the plurality of customers;
    creating a broadcast message, wherein the broadcast message comprises the customer-specific information for each of the plurality of customers in the subset of the plurality of customers and the identifier of the receiver associated with each of the plurality of customers in the subset of the plurality of customers;
    converting the customer-specific information for each of the plurality of customers into a at least one code corresponding to the customer specific information; and
    transmitting the broadcast message on the high-bandwidth connection to thereby allow each of the receivers associated with the plurality of customers in the subset of the plurality of customers to extract the at least one code for the customer based upon the identifier and, to convert the code into the customer-specific information utilizing a look-up table, the look-up table storing at least one of a text string, a descriptor or other information to be presented to the user not directly included in the code, and to display the customer-specific information to the customer,
    wherein the customer specific information includes information relating to the services purchased by each of the plurality of customers.

2. The method of claim 1 wherein the customer-specific information comprises billing information.

3. The method of claim 1 wherein the customer-specific information comprises a billing amount associated with television content provided over the high-bandwidth connection.

4. The method of claim 1 wherein the customer-specific information comprises information about particular services available to the customer via the high-bandwidth connection.

5. The method of claim 1 wherein the plurality of customers is selected based upon geographic area.

6. The method of claim 1 wherein the customer-specific information comprises billing information and wherein the plurality of customers is selected based upon a billing due date.

7. The method of claim 1, wherein each of the plurality of codes are associated with additional information stored within each of the plurality of receivers.

8. The method of claim 7 further comprising updating the additional information in each of the plurality of receivers via the high-bandwidth connection.

9. A method of providing customer-specific information to a customer associated with a television receiver, wherein the television receiver is configured to receive television content over a high bandwidth connection and to provide the television content to the customer on a display, the method comprising:
    receiving a communication comprising the customer-specific information via the high bandwidth connection at the television receiver;
    recognizing an identifier associated with the television receiver in the communication; and
    when the identifier associated with the television receiver is recognized, extracting the customer-specific information from the communication;
    determining, when the extracted customer-specific information includes a code, a message corresponding to the code based upon a look-up table, the look-up table storing at least one of a text string, a descriptor or other information to be presented to the user not directly included in the code; and
    presenting the customer-specific information and the message to the customer via the display,
    wherein the customer specific information includes information relating to the services purchased by each of the plurality of customers.

10. The method of claim 9 wherein the customer-specific information comprises billing information associated with the customer.

11. The method of claim 9 wherein the customer-specific information comprises a billing amount associated with services provided via the high-bandwidth connection.

12. The method of claim 9 wherein the customer-specific information comprises at least one of: an address for receiving bill payment, a billing due date, and instructions for paying a bill.

13. The method of claim 9 wherein the customer-specific information comprises information about particular services available to the customer via the high-bandwidth connection.

14. The method of claim 9 wherein the customer-specific information is automatically displayed to the customer without an express request from the customer.

15. The method of claim 9 wherein the customer-specific information is displayed to the customer in response to an express request from the customer.

16. The method of claim 9 further comprising automatically presenting a window to the customer on the display, wherein the window comprises an interactive link that is actuatable to display the customer-specific information.

17. The method of claim 9 wherein the high-bandwidth connection is a satellite link, and wherein the communication is a broadcast on the satellite link.

18. A television receiver system for providing television content received via a high-bandwidth connection to a display for viewing by a customer, the system comprising:
- a receiver interface configured to receive data via the high-bandwidth connection;
- a display interface to the display;
- a memory configured to store an identifier that uniquely identifies the television receiver system; and
- a processor coupled to the receiver interface, the display interface and the memory, wherein the processor is configured to receive the data from the receiver interface, to recognize the identifier in a broadcast message contained in the data, and, in response to recognizing the identifier in the broadcast message, to extract customer-specific information from the broadcast message and to present the customer-specific information to the customer via the display,
- wherein the customer-specific information comprises a code that corresponds to additional customer-specific information in a look-up table in the memory, the look-up table storing at least one of a text string, a descriptor or other information to be presented to the user not directly included in the code, and wherein the processor is configured to obtain the additional customer-specific information from the memory and to present the additional customer-specific information with the customer-specific information extracted from the broadcast message to the customer, and the customer specific information includes information relating to the services purchased by each of the plurality of customers.

19. The television receiver system of claim 18 further comprising a network interface to a communications link separate from the high-bandwidth connection, wherein the network interface is coupled to the processor.

20. The television receiver system of claim 19, wherein the customer-specific information comprises billing information and wherein the processor is further configured to process a bill payment transaction over the communications link.

21. The television receiver system of claim 18 wherein the customer-specific information comprises billing information and wherein the processor is further configured to automatically present the billing information to the customer on the display.

22. The television receiver system of claim 18 wherein the processor is further configured to present the customer-specific information on the display in a window separate from the television content.

23. The television receiver system of claim 22 wherein the window comprises an actuatable feature, and wherein the processor is further configured to display additional customer-specific information on the display in response to a customer input using the actuatable feature.

* * * * *